Sept. 7, 1948.  A. G. FORSYTH  2,448,789
SUPERCHARGED MULTIPLE MOTOR INTERNAL-COMBUSTION
UNIT FOR AIRCRAFTS
Original Filed May 16, 1942  2 Sheets-Sheet 1

Inventor
ARCHIBALD GRAHAM FORSYTH,
By Robert B Larson
Attorney

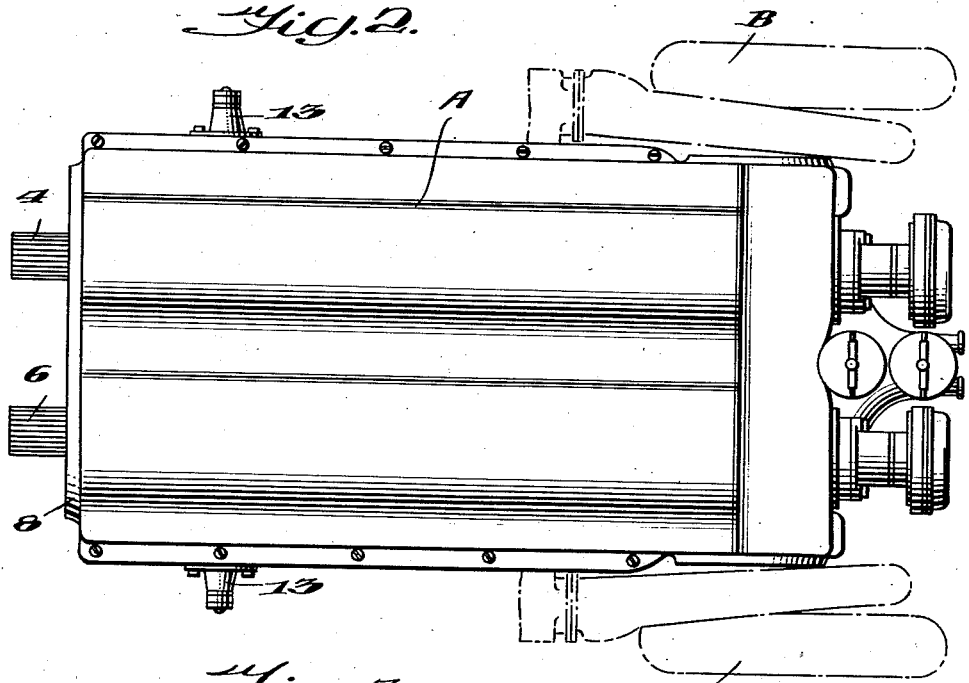
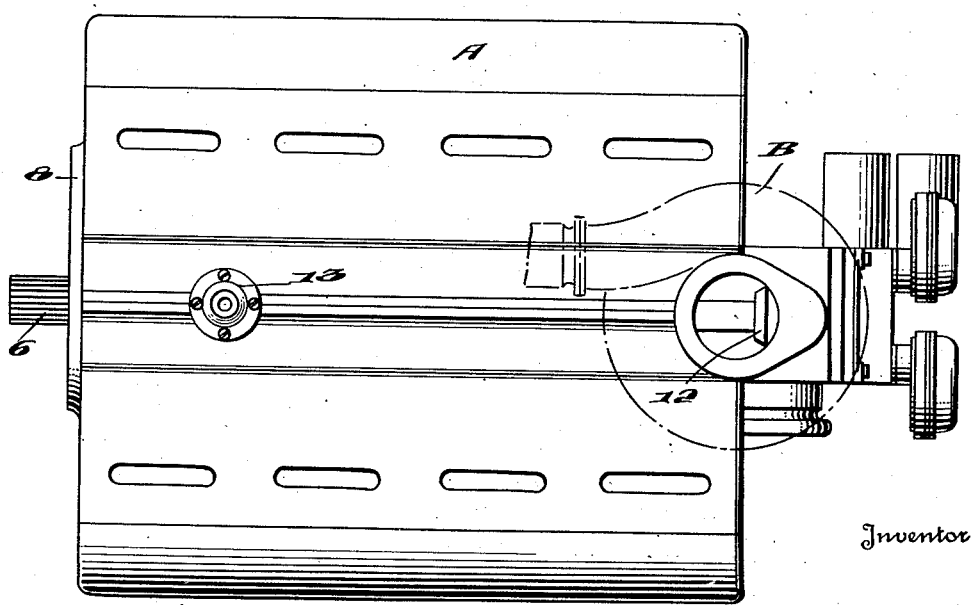

Patented Sept. 7, 1948

2,448,789

UNITED STATES PATENT OFFICE 2,448,789

SUPERCHARGED MULTIPLE MOTOR INTERNAL-COMBUSTION UNIT FOR AIRCRAFT

Archibald Graham Forsyth, Cheam, England, assignor to The Fairey Aviation Company Limited, Hayes, England Original application May 16, 1942, Serial No. 443,231. Divided and this application November 17, 1943, Serial No. 510,669

1 Claim. (Cl. 60—97)

This invention relates to power plant units for aircraft and the like, and more particularly it relates to a power plant unit which, while adapted for mass production, is capable of ready use, with various gearing arrangements to drive the propellers, in practically any type of aircraft.

This application is a division of my co-pending application Serial No. 443,231, filed May 16, 1942.

The principal object of the present invention is to provide such a power plant unit for aircraft and the like, and which may be used singly or in groups so arranged that the aircraft presents the minimum amount of head resistance.

Another object of the invention is to provide a power plant unit with which multi-engine reliability can be obtained for propelling various types of aircraft and the like.

A further object of the invention is the provision of a power plant unit which can be manufactured with mass production methods and which can be used singly or in groups in various combinations to drive contrarotating propellers.

The invention has for still another object the provision of a power plant unit which can be mass produced as such and which is so designed as to be later fitted with various types and arrangements of gear housings and superchargers.

These and other objects of the invention will be more apparent from the following description and claim when read in conjunction with the accompanying drawings, in which:

Figure 2 is a plan view of the unit.

Figure 3 is a side elevation of the unit.

Figure 1:
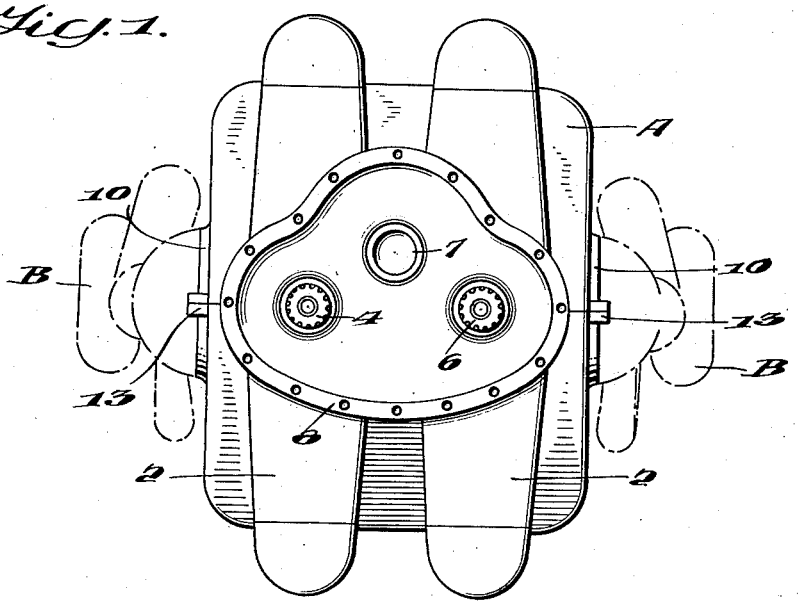
Figure 1 is a front view of a power plant unit constructed in accordance with the invention.

With specific reference to Figures 1, 2 and 3, it will be noted that these figures show various views of a main power plant unit A constructed in accordance with the invention and which is adapted to be produced by mass production methods. The units A will be described as consisting of two self-contained 12-cylinder internal combustion engines mounted on a common crank case, although obviously the motors of the unit may be provided with a different number of cylinders. As shown, each motor 2 is in the form of a flat 12-cylinder motor with the cylinders vertical. The complete unit A forms an H-type motor.

The two crank shafts run in opposite directions and their front ends 4 and 6, extending from the unit, are splined to receive various types of gearing, some of which will be described hereinafter.

Each power unit A is not provided with attached gearing for the crankshaft ends 4 and 6, but the front of the unit is provided with a facing 8 to which various types of gear-containing housings may be easily secured so that the gearing will be engaged and driven by the forwardly extending crankshaft ends 4 and 6.

Each motor 2 of a unit A is also provided with a side facing 10 at the rear side of the crankcase. These facings 10 are adapted to receive various forms of superchargers B (such as shown for example in broken lines in Figures 1, 2, and 3) which may be mechanically driven, such as by the bevel gears 12 (Figure 3), mounted on the rear ends of the crank shafts.

Each power unit A may also be provided with trunnions 13 or other support means, and also with the usual auxiliaries, such as ignition means, fuel pumps, and the like.

It should be noted that each unit A is adapted for production with mass production methods and comprises a complete power plant with two motors, the front end of the unit terminating in a flanged facing with the splined crank shaft ends extending forwardly and available to take the reduction gearing or the like in housings which can be detachably secured to the facing. It should further be noted that each motor 2 of a unit A is provided with a side facing rearwardly disposed on the crankcase and to which facings superchargers may be detachably secured so as to be driven through gearing operatively connected with the rear end of the crankshafts.

Manifestly the manufacture of power units so comprised is greatly simplified, and it should also be equally clear that power units so produced are capable of use in any number of various propelling arrangements. Consequently such a unit comprises a standard unit capable of universal use and interchangeable in all types of aircraft.

It has been previously indicated herein that each motor 2 is provided with a side facing 10 to which may be detachably secured a supercharger B. These superchargers carry gearing (not shown) which may be driven through gears connected with the rear ends of the motor crank shafts. With power units so constructed it is possible to obtain a number of different supercharging arrangements.

Figure 4:
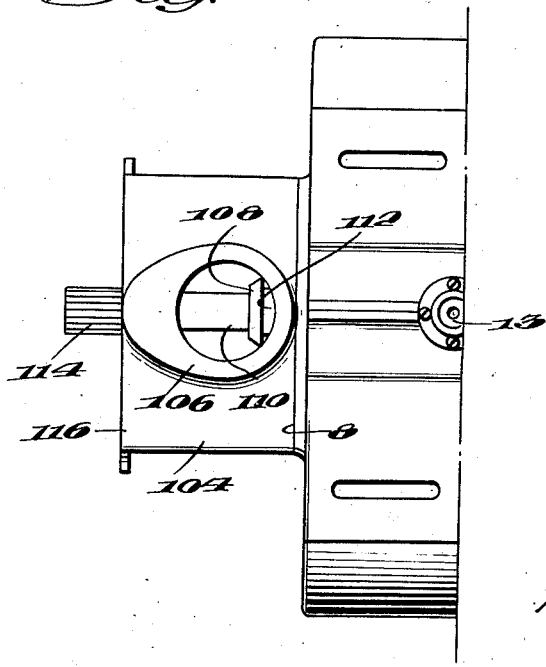
Figure 4 is a side elevation of an extension member applied to the front of a power unit to accomplish the addition of superchargers at the front.

In order to mount superchargers at the front of the unit it is necessary to add to the front facing 8 of the power unit A, as shown in Figure 4, an extension housing 104. The sides of this extension housing are provided with facings 106 on which the additional superchargers can be mounted. These additional superchargers, so mounted, may be driven mechanically from bevel gears 108 mounted on extension shafts 110, the inner end 112 of which engages over the splined crank shaft ends 4 and 6. The outer ends 114 of the extension shafts 110 are splined in the same manner as the crank shaft ends 4 and 6. The outer end of the extension 104 is constituted as a facing 116 adapted to receive various types of gear housings, such as those previously described herein.

It should be manifest from the above that units constructed in accordance with the invention are adapted for use with superchargers which may be easily attached to make almost every possible type of supercharger system.

As indicated in the recited objects of the invention, and as will now be more apparent from the preceding descriptions, the invention makes it possible to provide airplanes with high power units so designed as to be capable of use in such manner as to reduce the head resistance of the craft to a minimum.

Moreover, power units as described may be mass produced as a standard unit which can, as shown, be used to drive any number of different propelling systems.

While a preferred embodiment of the power unit has been described and illustrated, it should be understood that changes in structure and arrangement may be made without departing from the basic concept of the invention.

I claim:

A power unit for aircraft and the like, comprising two internal combustion motors having a common crankcase one end wall of which terminates in a facing with the crankshaft ends extending through said end wall, whereby housings containing different types of gearing may be detachably mounted over said facing, the side walls of said crankcase near the other end wall having faced openings, whereby superchargers may be detachably secured to the facings of said openings, an extension housing detachably secured to said end wall facing, said extension housing having side faced openings over which superchargers may be detachably disposed, crankshaft extensions disposed in said housing and extending through the forward wall thereof, and means on said crankshaft extensions for driving the superchargers when they are attached.

ARCHIBALD GRAHAM FORSYTH.

REFERENCES CITED

The following references are of record in the file of this patent:

UNITED STATES PATENTS

| Number | Name | Date |
|---|---|---|
| 807,048 | Ronan | Dec. 12, 1905 |
| 948,248 | Reaugh | Feb. 1, 1910 |
| 1,306,864 | Stoddard | June 17, 1919 |
| 1,341,709 | Dodge | June 1, 1920 |
| 1,394,870 | Thomas | Oct. 25, 1921 |
| 1,528,216 | Klingbeil | Mar. 3, 1925 |
| 1,559,628 | Larkin | Nov. 3, 1925 |
| 1,874,681 | Woolson | Aug. 30, 1932 |
| 1,882,448 | Roche | Oct. 11, 1932 |
| 2,255,773 | Heftler | Sept. 16, 1941 |
| 2,271,163 | Spencer | Jan. 27, 1942 |
| 2,300,977 | Schlaepfer | Nov. 3, 1942 |